(12) United States Patent
Ebert et al.

(10) Patent No.: US 6,956,081 B2
(45) Date of Patent: Oct. 18, 2005

(54) FILLED POLYAMIDE MOLDING MATERIALS HAVING IMPROVED PROCESSING BEHAVIOR

(75) Inventors: Martina Ebert, Domat/Ems (CH); Reinhard Furst, Chur (CH); Franz Felsberger, Eccleshall (GB)

(73) Assignee: Ems-Chemie AG, Domat/Ems (CH)

( * ) Notice: Subject to any disclaimer, the term of this patent is extended or adjusted under 35 U.S.C. 154(b) by 513 days.

(21) Appl. No.: 10/099,813

(22) Filed: Mar. 13, 2002

(65) Prior Publication Data
US 2002/0173584 A1 Nov. 21, 2002

(30) Foreign Application Priority Data

Mar. 15, 2001 (EP) .................... 01106556

(51) Int. Cl.$^7$ .................... C08K 3/40; C08L 77/00
(52) U.S. Cl. .................... 524/494; 524/495; 524/602; 528/335
(58) Field of Search .................... 524/494, 495, 524/602; 528/335

(56) References Cited

U.S. PATENT DOCUMENTS 5,440,006 A * 8/1995 Lahary et al. .............. 528/349
5,897,901 A * 4/1999 Visioli .................... 426/392

FOREIGN PATENT DOCUMENTS

| EP | 0 532 963 A | 3/1993 |
| EP | 0 728 812 A | 8/1996 |
| EP | 1 018 534 A | 7/2000 |

OTHER PUBLICATIONS

Database WPI Section Ch, Week 199522 Derwent Publications Ltd., London, GB; AN 1995–167389 XP002169077 & JP 07 090178 A (Mitsubishi Kasei Corp) (Apr. 4, 1995) *Zusammenfassung*.

* cited by examiner

Primary Examiner—Tae H. Yoon
(74) Attorney, Agent, or Firm—Joseph T. Guy; Nexsen Pruet, LLC (57) ABSTRACT

The invention relates to reinforced thermoplastic polyamide molding materials having simultaneously good surface quality, good flowability and good heat dimensional stability, from polyamide compositions on the basis of semi-crystalline semi-aromatic polyamides and copolyamides having a melting point of at least 240° C. (A) and amorphous (co)polyamides (B).

The molded articles produced by the molding materials according to the present invention are used for production of interior and exterior parts, especially having structural or mechanical function in the fields of electric components, electronics, telecommunication, automobile, transport, packaging, domestic, furniture, sports, apparatus engineering, machine construction, heating installation, air conditioning, and sanitation.

19 Claims, 2 Drawing Sheets

FIG. 1.a

FIG. 1.b

FILLED POLYAMIDE MOLDING MATERIALS HAVING IMPROVED PROCESSING BEHAVIOR

BACKGROUND OF THE INVENTION

1. Field of the Invention

The invention relates to reinforced, especially, highly filled polyamide molding materials having improved processing behaviour, increased flowability, improved surface quality, and good thermal properties. The molding materials according to the present invention are suitable for production of molded articles, especially, having high wall thickness or other semi-finished products or finished articles, prepared for example, by extrusion, extrusion blow-molding, extrusion stretch-blow-molding, pultrusion, injection molding, gas assisted injection molding(GIT), injection-blow molding or other molding methods.

The molded articles produced by molding materials according to the present invention are used for production of interior and exterior parts, especially having supporting or mechanical function in the field of electricity, electronics, telecommunication, automobile, transport, packaging, domestic, furniture, sport, apparatus engineering, machine construction, heating installation, air conditioning, sanitary.

2. Background and Prior Art

Molded materials from reinforced polyamide blends are of increasing importance in the field of technical engineering materials which have to show besides high rigidity, tenacity and heat dimensional stability for uses in visual range also an optimal surface quality. Exterior parts being exposed to weathering require additionally an appropriate stability to ensure the necessary function for several years.

The special advantage of reinforced polyamides is the extremely good bond between polymer matrix and reinforcing materials. Thereby, high reinforcing ratios are possible leading to high-rigidity products having good processable in injection molding process due to the low melt viscosity of semi-crystalline polyamides.

In the following, polyamides have to be understood to be such polymers, wherein the monomer units are mainly, i. e. up to at least about 60%, linked together by amide bonds, i.e. by CO—NH-bonds and constituted of lactams, amino acids or diamines and dicarboxylic acids. Suitable monomers for production of polyamides are: caprolactam, laurolactam, aminocaproic acid, aminoundecanoic acid, aminododecanoic acid, diaminobutane, hexamethylenediamine, methylpentamethylenediamine, 3,3'-dimethyl-4,4'-diaminocyclohexylmethane (MACM), 1,6-diamino-2,2,4-trimethylhexane, 1,6-diamino-2,4,4-dimethylhexane, m-xylylenediamine, p-xylylenediamine, diaminononane, diaminodecane, diaminododecane, 2,2-bis(p-aminocyclohexyl)propane, bis(p-aminocyclohexyl)methane (PACM), isophorondiamine, polypropyleneglycoldiamine, diaminonorbornane, 1,3-bis(aminomethyl)cyclohexane, TCD diamine, succinic acid, glutaric acid, adipic acid, azelaic acid, sebacic acid, dodecandioic acid, dimer acid, terephthalic acid, isophthalic acid, cyclohexanedicarboxylic acid, 2,6-naphthalenedicarboxylic acid, tert-butyl isophthalic acid, and phenylindanedicarboxylic acid. Also, the reaction of the acid chlorides or esters to polyamides is included as the polycondensation is the commonly used process.

The designation of the polyamides corresponds to international standard ISO 1874-1: the first number indicating the number of C atoms of the starting amine and the last number indicating the number of C atoms of the dicarboxylic acid. When only one number is given, that means that one starts from an amino-carboxylic acid or its lactam, respectively (see, H. Domininghaus, Die Kunststoffe und ihre Eigenschaften, published by VDI 1976, p. 272).

Thereby, the diamine is always cited at first position for AA-BB type polyamides. For example, the polyamide from hexamethylenediamine and sebacic acid is designated as polyamide 610 (PA 610), the polyamide from caprolactam is designated as PA 6.

Sometimes, special combinations of letters exists for aromatic and cycloaliphatic monomers, for example, T for terephthalic acid, I for isophthalic acid.

The components are separately listed by slash in order of their parts per amount and are followed by the parts per amount within brackets, e. g. copolyamide 6/66/610 (50:30:20) to characterize copolyamides.

The number average molecular weight of the polyamides described herein should be over 5000, preferably over 7000.

The drawback of reinforced semi-crystalline polyamide molding materials such as, for example PA 66, is the strong decrease of the rigidity by water absorption in standard operating environment. Reinforced polyamide molding materials (PA 66) tend to have poor surfaces, in particular, for molded parts having high wall thickness due to the high melt temperature and an extremely high velocity of crystallization.

Inclusion of high amounts of reinforcing materials such as, for example glass fibres, into a rapidly solidifying PA 66 polymer matrix reduces the flowability, for example, during the injection molding processing and leads to reduced surface quality. In these cases, one attempts to maintain the filling ratio low and to achieve the rigidity by reinforcing ribs.

From DE-A-17 69 040 (Dynamit Nobel AG) non-reinforced molding materials of semi-crystalline aliphatic polyamides and amorphous copolyamides being mixed in an extruder are known.

DE 26 42 244 C2 (Inventa AG) indicates that reinforced molding materials can be produced by extruding amorphous MACMI/12 type copolyamides and semi-crystalline aliphatic polyamides, thereby changing the mechanical properties.

EP 70001 B2 (Dupont) describes non-reinforced and reinforced molding materials on the basis of semi-crystalline aliphatic polyamides and amorphous polyamides consisting of 40–98 mol-% of units of isophthalic acid, 2–60 mol-% of units of terephthalic acid, 50–98 mol-% of units of hexamethylenediamine and 2–50 mol-% of units of bis(P-aminocyclohexyl)-methane (PACM). Thereby, the tenacity (tensile strength) of the molding materials should be improved. The drawback of these mixtures is the risk that inhomogenities in the molded article can arise as a result of phase separation.

By adding 30–95 wt.-% of amorphous polyamides such as, for example, hexamethylene isophthalamide PA 6I (DE 37 05 228 A1, EP 279 342 A1) (Bayer AG) to reinforced PA 66 improved flow properties in the melt and increased elongation at break in the molded part are found. At the same time an improvement of the surface quality (DE 32 00 428 C2) (Bayer AG) is found. The drawback of these mixtures is the risk that inhomogenities in the molded article can arise as a result of phase separation. Further, the heat dimensional stability decreases with increasing amount of PA 6 I. The difference of the rigidities in the dry and conditioned state increases with decreasing amount of PA 6 I.

EP 400 428 A1(BASF AG) describes molding materials of semi-crystalline semi-aromatic copolyamides (6T/6) extruded with amorphous copolyamides (6I/6T: 60/40 wt.-%). These molding materials show an improved tenacity with regard to pure CoPA 6T/6 and PA 66, but have, in comparison to CoPA 6T/6I , low melting points. A drawback of these products is the strong decrease of rigidity after water absorption. Additionally, these low melting points have a disadvantageous effect on the heat dimensional stability.

EP 0 728 812 A1(BASF AG) describes thermoplastic molding materials of a semi-crystalline semi-aromatic copolyamide including 30–44 mol-% of units of terephthalic acid, 6–20 mol-% of units of isophthalic acid, 43–49.5 mol-% of units of hexamethylenediamine and 0.5–7 mol-% units of an aliphatic alicyclic diamine and an amorphous polyamide. The drawback of these compositions is the decrease of properties such as HDT (Heat Deflection Temperature) with increasing amounts of an amorphous polyamide such as e. g. PA 6I/6T.

To obtain improved surface quality and good rigidity EP 0 532 963 A2 (BASF AG) proposes thermoplastic molding materials on the basis of polyamide blends of 1–18 wt.-% of a semi-crystalline semi-aromatic copolymer and 22–99 wt.-% of a semi-crystalline polyamide. The substitution of this semi-crystalline polyamide by an amorphous polyamide results to a reduction of gloss.

Excellent surface qualities at high filling ratios are obtained (DE 43 21 247 C2 (Asahi)), when a copolymer such as, for example a PA 66/6I, is produced from the constituents of a semi-crystalline polyamide such as PA 66 (70–95 wt.-%) and an amorphous polyamide such as PA 6I (5–30 wt.-%). The constancy of the mechanical properties in both dry and conditioned state is unsatisfactory. The decrease of the melting point has a undesirable effect on the heat dimensional stability, also indicated as HDT (Heat Deflection Temperature).

Improved flowabilities without negative effect on the tenacity, rigidity and heat dimensional stability can be obtained by addition of 4–8 wt.-% of a PA prepolymer based on the amount of the polymer matrix (DE 198 21 719 A1(EMS-Inventa AG)). A 6T/6I type semi-aromatic PA of the composition 70/30 wt.-% having relative viscosities of 1.01 to 1.3 as measured in 0.5% solution of m-cresol is used as PA prepolymer to a polymer matrix of PA 66, PA 66+PA 6I/6T (blend) or PA 12. The flow lengths and surfaces of the molded parts can be strongly improved despite of high filling ratios of 50–70% of glass fibres. Again, the drawback of these mixtures is the risk that inhomogenities in the molded article can arise as a result of phase separation. Further, blends, for example on basis of PA 66 with PA prepolymer, show still strong differences for the rigidity in dry and conditioned state. However, these blends described by DE 198 21 719 show a low HDT in comparison to a PA 6T/6I.

Still, an unpublished application DE . . . (EMS-Chemie AG) describes that the combination of a corresponding copolymer such as, for example, PA 66/6I/6T or of PA 6/6I/6T and amorphous PA 6I/6T and PA prepolymer such as, for example, PA 6T/6I having very low viscosity, improvements of the flowability and surface quality are possible, without the risk of inhomogenities in the molded article by phase separation of the blends. Simultaneously, by appropriate selection of the components HDT, tenacity and rigidity can be adjusted to an acceptable level and the influence of water absorption while conditioning can be reduced. However, altogether these blends show a relatively low HDT in comparison to a PA 6T/6I.

JP-A-7090178 (Mitsubishi) describes polyamide compositions which can be processed to molded parts, sheets, injection-molded or extruded parts. These polyamide compositions are supposed to have good mechanical properties such as high flexural strength not only at normal, but also at high temperatures. The polyamide compositions as described by JP-A-7090178 (Mitsubishi) should consist of 95 to 25 parts per mass of a crystalline, aromatic polyamide resin having a melting enthalpy of at least 3 cal/g, which consist of dicarboxylic acid units consisting of 30–100 mol-% of units of terephthalic acid and 0–40 mol-% of units of aromatic dicarboxylic acid other than units of terephthalic acid and/or 0–70 mol-% of units of aliphatic dicarboxylic acid and units of aromatic and/or alicyclic alkylenediamine and 5–75 parts per mass of a non-crystalline or low-crystalline polyamide resin having a melting enthalpy of not more than 1 cal/g and 5–200 parts per mass of inorganic fibres based on 100 parts per mass of polyamide resin. According to JP-A-7090178 by adding the crystalline aromatic polyamide resin instead of a crystalline aliphatic polyamide resin a positive effect on the flexural strength and flowability is achieved. However, HDT, tenacity, rigidity and the surface quality can not be increased simultaneously to a high level by the selection of the component according to JP-A-7090178. With higher amounts of the amorphous component the heat dimensional stability is decreased strongly. In addition, the mechanical thermal properties such as for example low creep at conditioned state can not be satisfied by the molding materials according to JP-A-7090178.

EP 1018534 A2 (Ube Industries) describes polyamide resin compositions having improved weld line strength. The polyamide compositions comprise 95–55 wt.-% of a crystalline semi-aromatic copolyamide having an aromatic monomer unit (6T) and a melting point of 260–320° C. and/or a crystalline aliphatic polyamide resin and 5–45 wt.-% of a polyamide resin comprising units derived from xylylenediamine and units of an aliphatic dicarboxylic acid or a non-crystalline semi-aromatic polyamide resin composition having at least 2 aromatic monomer units. Further, the polyamide composition according to EP 1018534 A2 comprises 5–200 parts per weight of an inorganic filler. There is disadvantageous that the PA-compositions as described have only glass transition temperatures up to 100° C. In particular, the melting points being partly very low have a negative effect on the heat dimensional stability. The constancy of properties in conditioned state is unsatisfactory.

BRIEF SUMMARY OF THE INVENTION

Hence, it is object of the present invention to provide reinforced thermoplastic polyamide molding materials showing simultaneously a substantially improved surface quality and good mechanical and good thermal properties in comparison to the polyamide compounds described above by prior art.

According to the present invention this object is solved by the reinforced thermoplastic molding materials which are formed from semi-crystalline semi-aromatic polyamides and copolyamides having a melting point of at least 240° C. (A) and amorphous (co)polyamides (B), characterized in that said polyamide compositions comprise:

As component (A) 92–85 wt.-% of a semi-crystalline semi-aromatic (co)polyamide, formed by:

($A_1$) 50–80 mol-% of units of terephthalic acid based on the whole amount of total acids, ($A_2$) 20–50 mol-% of units of isophthalic acid based on the whole amount of total acids, the sum of units of dicarboxylic acids being 100 mol-%, ($A_3$) 100 mol-% of units of at least one linear or branched aliphatic diamine having 4–25 carbon atoms, especially hexamethylenediamine, the percentage molar amount of phthalic acids in said semi-crystalline semi-aromatic (co)polyamide being nearly 100 mol-% and the percentage molar amount of diamines being nearly 100 mol-%, (B) 8–15 wt.-% of a non-crystalline or low-crystalline (co)polyamide having a melting enthalpy of not more than 1 cal/g, formed by ($B_1$) 55–100 mol-% of units of isophthalic acid based on the whole amount of total acids, ($B_2$) 0–45 mol-% of units of terephthalic acid based on the whole amount of total acids, ($B_3$) 100 mol-% of units of at least one linear or branched aliphatic or alicyclic diamine having 4–25 carbon atoms, especially hexamethylenediamine, based on the whole amount of present diamines the percentage molar amount of phthalic acids in said semi-crystalline semi-aromatic (co) polyamide being nearly 100 mol-% and the percentage molar amount of diamines being nearly 100 mol-%, Further, the object is solved by the method for production of polyamide molding materials characterized in that components of the polyamide composition are mixed in the melt or dry and if required, prepolymeric polyamides having defined viscosities and in amounts of 0.1 to 20 wt.-% of the polyamide matrix are mixed to said polyamide molding materials in said melt or dry, and at processing temperatures of 250–380° C. they are processed and discharged.

DETAILED DESCRIPTION OF THE INVENTION

The inventors of the present application have found the PA6T/6I molding materials highly filled with glass fibres with long flow length show unsatisfactory surface quality. Especially for black or dark-coloured molding materials they show optically visible defects such as whitish or grey markings (that is impairment of the colour depth effect) and/or wrinkle formations and/or so-called "tiger skin structures", i.e. scale-like, non-smooth surface structure. Additionally, the defects can strongly impair the varnishability of the parts and/or require additional expenditure for varnishings which can be especially disadvantageous for molded parts in motor vehicles.

The resulting insufficient surface quality of the molded part from molding materials of copolyamide 6I/6T can be explained as follows. Copolyamide 6T/6I (70/30) is processed at a melt temperature of 340° C., the melting point is at 325° C., the mass or skin, respectively solidifies at about 310° C. already in the mold. If the skin of the part already achieves this solidification temperature during the mold filling phase under the low mold filling pressure, an exact copy of the mold surface is not possible any more. This material-specific behaviour is already visible for "normal" injection molded parts and becomes even more substantial for bulky GIT-parts or parts having long flow lengths, since therein the filling times are longer and the pressures are lower.

However, the possibilities to improve process conditions are limited because the temperature difference between melt temperature and solidifications temperature is insufficient. At high temperatures of e. g. 345° C., a material degradation typically is found (a problem of residence time); thus, it does not seem to be convenient to adjust to even higher mass temperature. The time until the solidification of the melt or of the skin, respectively can be extended by a high mold surface temperature. Herein, a polyamide 6T/6I (70/30) reacts well and shows improved surfaces at very high mold temperatures such as 160° C. which are, however, very often difficult to realise as a practical matter.

A further proceeding to improve the surface is a injection velocity as high as possible during the mold filling phase. Then, the pressure effective in the mold becomes higher and the period until the increase of pressure is shorter. However, for bulky parts the machines are at the limit of capacity and filling times below 1 second cannot be achieved.

It is noted that improved, finer surfaces can be achieved by reduction of the viscosity of material.

A reduction of viscosity can be achieved by a lower polymerisation degree. However, the tenacity is also strongly reduced, which is less desired. Therefore, it is better to reduce the viscosity of the melt by additives such as e. g. lubricants. However, lubricants act to the improve processability, but generally impair the surface. Therefore, low-melting and if possible at the required processing temperatures, liquid polymers such as PA 66 or polyamide 12 are better. However, the effect is limited. Additives such as prepolymers already have shown improved effects (see DE 198 21 719 (EMS-Inventa AG).

Surprisingly, the inventors of the present invention have found that by addition of semi-compatible amorphous polyamides such as a preferred polyamide 6I/6T and an especially preferred polyamide 6I/6T (67/33) as a dryblend or compound in an amount of 8–15 wt.-% to a semi-crystalline semi-aromatic copolyamide, and especially a polyamide 6T/6I (70/30), achieves an excellent surface quality for the resulting molded parts. Simultaneously good mechanical and acceptable thermal properties are obtained without reducing the heat dimensional stability to an unacceptable level. According to the present invention, these properties could be exclusively achieved from molding materials from polyamide compositions comprising 8–15 wt.-% and especially 10–15 wt.-% of a non-crystalline or low-crystalline copolyamide such as component B (B) 8–15 wt.-% of a non-crystalline or low-crystalline (co)polyamide having a melting enthalpy of not more than 1 cal/g, formed by ($B_1$) 55–100 mol-% of units of isophthalic acid based on the whole amount of total acids, ($B_2$) 0–45 mol-% of units of terephthalic acid based on the whole amount of total acids, ($B_3$) 100 mol-% of units of at least one linear or branched aliphatic or alicyclic diamine having 4–25 carbon atoms, especially hexamethylenediamine, based on the whole amount of present diamines the percentage molar amount of phthalic acids in said semi-crystalline semi-aromatic (co)polyamide being nearly 100 mol-% and the percentage molar amount of diamines being nearly 100 mol-%, Additions of component (B) which are below the above-mentioned amount have no effect or yield only insignificant surface improvements.

It is especially preferred that the polyamide composition according to the present invention on the basis of semi-crystalline semi-aromatic polyamides and copolyamides having a melting point of at least 240° C., also, designated as component (A) comprises 8–15 wt.-% of a polyamide 6I/6T (67/33) (B). The inventors have found that higher amounts of the amorphous copolyamide (B) and especially higher amounts of a polyamide 6I/6T (67/33) lead to a strong decrease of the dimensional stability HDT/A and HDT/C (Heat Deflection Temperature, ISO 75)

Thus, according to the present invention for purposes of the proper molding, e.g. for GIT-method or also, for any other method the solidification velocity and the solidification temperature of the semi-crystalline copolyamide (A) is reduced by a modification with amorphous (co)polyamide (B), preferably by a variant of a polyamide PA 6I/6T (67/33) being compatible/mixable with the melt such as e. g. the commercial article Grivory® G21 from company EMS-Chemie AG, Switzerland.

Both polyamide (A) and polyamide (B) comprise exclusively dicarboxylic acids, terephthalic acid and isophthalic acid, which leads to especially compatible mixtures. Low amounts of aromatic dicarboxylic acids can be replaced for slight changes of the solidification behaviour, melting behaviour, the glass transition temperature, the flowability, the processability, the thermal resistance or for other reasons by adding other dicarboxylic acids such as succinic acid, glutaric acid, adipic acid, azelaic acid, sebacic acid, dodecandioic acid, other dimer acids, cyclohexanedicarboxylic acid, 2,6-naphthalene dicarboxylic acid, tert-butyl isophthalic acid, phenylindanedicarboxylic acid. Also, the addition of low amounts of lactams or amino acids such as caprolactam, laurolactam, aminocaproic acid, aminoundecanoic acid, aminododecanoic acid are possible. Also, to adapt the melting behaviour, the solidification behaviour, the glass transition temperature, the processability, the flowability, the chemical and the thermal resistance to special conditions the addition of further low amounts of diamines such as m-xylylene diamine, methylpentamethylenediamine and the like are possible.

Thus, the present invention relates to reinforced thermoplastic polyamide moldingmaterials having simultaneously good surface quality, good flowability and good heat dimensional stability from polyamide compositions formed from semi-crystalline semi-aromatic polyamides and copolyamides having a melting point of at least 240° C. (A) and amorphous (co)polyamides (B), the polyamide compositions comprising:

(A) 92–85 wt.-% of a semi-crystalline semi-aromatic (co)polyamide, formed by
  ($A_1$) 50–80 mol-% of units of terephthalic acid based on the whole amount of total acids,
  ($A_2$) 20–50 mol-% of units of isophthalic acid based on the whole amount of total acids, the sum of units of dicarboxylic acid being 100 mol-%
  ($A_3$) 100 mol-% of units of at least one linear or branched aliphatic diamine having 4–25 carbon atoms, especially hexamethylenediamine,
  the percentage molar amount of phthalic acids in the semi-crystalline semi-aromatic (co)polyamide being nearly 100 mol-% and the percentage molar amount of diamines being nearly 100 mol-%, (B) 8–15 wt.-% of a non-crystalline or low-crystalline (co)polyamide having a melting enthalpy of not more than 1 cal/g, formed by
  ($B_1$) 55–100 mol-% of units of isophthalic acid based on the whole amount of total acids,
  ($B_2$) 0–45 mol-% of units of terephthalic acid based on the whole amount of total acids,
  ($B_3$) 100 mol-% of units of at least one linear or branched aliphatic or alicyclic diamine having 4–25 carbon atoms, especially hexamethylenediamine,
  the percentage molar amount of phthalic acids in the non-crystalline or low-crystalline (co)polyamide being nearly 100 mol-% and the percentage molar amount of diamines being nearly 100 mol-%, (C) 25–70 wt.-% of a fibrous or particle type filler or mixtures therof
(D) 0–20 wt.-% of a rubber-like polymer, and
(E) up to 30 wt.-% of usual additives and processing aid agents based on the whole weight of the components (A) to (D), if required,
  wherein the additives and processing aid agents can preferably be selected from the group consisting of chain capping agents, stabilizers, crystallization agents, plasticizers, dyes, pigments, antoxidants, flame retardants, antistaticas, lubricants, mold release agents, conductive additives and metal powders.

The production of the semi-crystalline semi-aromatic (co)polyamides (A) having especially a melting point of 280–350° C. and having a relative viscosity as measured in 0.5% solution of m-cresol between 1.50 and 1.90, preferably between 1.55 and 1.65 is made according to known continuous 2-step condensation methods.

The amount of the semi-crystalline semi-aromatic (co)polyamide (A) is preferably 90–85 wt.-% in the polyamide mixture and the amount of the non-crystalline or low-crystalline (co)polyamide (B) is 10–15 wt.-%.

In a preferred embodiment the semi-crystalline semi-aromatic (co)polyamide (A) consists of 60–80 mol-% of terephthalic acid, 20–40 mol-% of isophthalic acid in equimolar amounts with hexamethylenediamine.

The non-crystalline or low-crystalline (co)polyamide (B) consists of 60–80 mol-% of isophthalic acid, 20–40 mol-% of terephthalic acid and 100 mol-% of hexamethylenediamine, the percentage molar amount of phthalic acids being nearly 100 mol-% and the percentage molar amount of diamines being nearly 100 mol-%.

The production of the amorphous copolyamides (B) is made according to known condensation methods for polyamides using batch methods in pressurized reactors.

The non-crystalline or low-crystalline (co)polyamide (B) has preferred values for the relative viscosity of 1.35–1.60 as measured in 0.5% solution of m-cresol. In a preferred embodiment a polyamide having a relative viscosity of 1.38–1.45 as measured in 0.5% solution of m-cresol can be used as the (co)polyamide (B).

Also, prepolymeric polyamides having relative viscosities of 1.01–1.30 (as measured in 0.5% solution of m-cresol) can be added in amounts of 0.1–20 wt.-% to the polyamide compositions according to the present invention. The prepolymeric polyamides can be of same type as the polyamide molding materials according to the present invention or different type. According to the present invention the components which were defined more detailed above are considered as monomer components: caprolactam, laurolactam, aminocaproic acid, aminoundecanoic acid, aminododecanoic acid, diaminobutane, hexamethylenediamine, methylpentamethylenediamine, 3,3'-dimethyl-4,4'-diaminocyclohexylmethane (MACM), 1,6-diamino-2,2,4-trimethylhexane, 1,6-diamino-2,4,4-dimethylhexane, m-xylylenediamine, p-xylylenediamine, diaminononane, diaminodecane, diaminododecane, 2,2-bis(p-aminocyclohexyl)propane, bis(p-aminocyclohexyl)

methane (PACM), isophorondiamine, polypropyleneglycoldiamine, norbornanediamine, 1,3-bis (aminomethyl)cyclohexane, TCD diamine, succinic acid, glutaric acid, adipic acid, azelaic acid, sebacic acid, dodecandioic acid, dimer acid, terephthalic acid, isophthalic acid, cyclohexane dicarboxylic acid, 2,6-naphthalene dicarboxylic acid, tert-butyl isophthalic acid, phenylindanedicarboxylic acid. The production of the prepolymeric polyamides is made according to the method described by DE 198 21 719 (EMS-Inventa AG).

The crystalline copolymer (A) and the amorphous polyamide (B) can comprise suitable capping agents known by those skilled in the art to limit the viscosity into the desired range. Preferably, monoamines and/or monocarboxylic acids such as e. g. benzoic acid, acetic acid are used.

Further, according to the present invention especially preferred are capping agents such as 4-amino-2,2,6,6-tetraalkylpiperidine or 2,6-dialkylphenols having methylamine or carboxylic functional groups or types of capping agents comprising one or more of these groups.

Further, compounds on the basis of hypophosphorous acid, phosphorous acid or phosphoric acid or derivates of the sulfurous acid such as, e.g. sulfites, thiosulfates, etc. and appropriate antioxidants such as, for example, sterically hindered hydroxyphenols can be added to the respective polymerization formulation of the polymers (A) and (B).

Further, appropriate antifoaming agents consisting of silicones and derivates of silicone can be used within polymerization formulation. Preferably, together with silicic acid in the form of stable aqueous emulsions.

Especially, the copolyamide (A) according to the present invention and the copolyamide (B) have a low amount of triamine. This can be accomplished by maintaining the residence times of polyamides very short and the process temperatures relatively low during production process, thereby suppressing the formation of triamines.

Optionally, the polymerization formulation can comprise appropriate release agents and lubricants such as, for example, fatty acid esters, waxes or fatty acid amides.

The molding materials according to the present invention can comprise 25–70 wt.-% of a fibrous or particle type filler or mixtures thereof. Especially preferred are molding materials comprising 50 wt.-% of a filler. Especially, glass fibres such as short glass fibres or rovings are used as filler. Also, glass spheres, glass powders, polymer fibres, carbon fibres, metal fibres or mineral materials such as talcum, chalk, kaolin and mica, wollastonite and other silicates can be used. Preferably, the polyamide molding material according to the present invention comprises up to 6 wt.-% of carbon black as further additive (E).

Carbon black can be used in commercially available masterbatch form with PA 12, PA 6, PA 66 or polyolefins as particularly effective stabilisation for weathering resistance.

Obviously, conventional stabilizers, lubricants, dyes, pigment, metal flitter, metal pigments, stamped metal flitter, flame retardants, impact modifiers, antistatics, conducting additives, anti-fogging agents, mold release agents, optical brighteners, fragrances, fungistatics, oxidation retardants and heat stabilizers such as e. g., halogens of metals of the Group 1 of the classification of elements, e. g., sodium halides, potassium halides, lithium halides, if required, in combination with copper halides can be added as further components into the molding materials according to the present invention.

Herein, red phosphorus, polybromostyrenes, such as, e. g., the commercial article Pyrochek 68 PB® and the other flame retardants known for polyamides, such as metal hydroxides such as $Mg(OH)_2$ are mentioned for example as flame retardants. It is recommendable to use a synergist in the case of employing halogen-containing flame retardants. Compounds of antimony, boron and tin are suitable. These are used generally in amounts of 0.5 to 10 wt.-% based on the thermoplastic mass.

Single-screw and, preferably, twin-screw extruders comprising appropriate conveying elements and kneading elements can be employed to produce the molding materials according to the present invention. Preferably, the semi-crystalline and the amorphous (co)polyamides are mixed with the smaller amounts of additives and dosed into the feed zone of the extruder. Glass fibres are introduced by a sidefeeder, preferably, as near as possible at the extrusion die.

The production of the molded parts, semi-finished products, extruded materials or hollow parts is performed by commercial installations. Suitable processing temperatures are between 250 and 380° C. Alternatively, additives and single components can be added in the form of appropriate masterbatch formulations directly within the processing unit.

A rubber-like polymer (elastomer) in amounts of up to 20 wt.-%, preferably in amounts of 1–10 wt.-% can be comprised in the thermoplastic molding materials according to the present invention as further component (D). As nonlimiting examples are mentioned impact-resistant modified rubbers (elastomers) on the basis of ethylene, propylene, butadiene and acrylate or mixtures of these monomers. Such polymers are known from those skilled in the art. Herein, only EP, EPDM, SEBS, SBS, SAN type impact modifiers are mentioned as types.

The molding materials according to the present invention are used for the production of hollow parts and molded parts. The molded parts are produced from the molding materials according to the present invention according to known forming techniques of polymer melts by extrusion, extrusion blow-molding, extrusion stretch-blow-molding, pultrusion, injection molding, gas injection molding(GIT), injection-blow molding, or other forming techniques.

The molded articles produced by molding materials according to the present invention are used for production of interior and exterior parts, especially having structural or mechanical function in the field of electricity, electronics, telecommunication, automobile, transport, packaging, domestic, furniture, sport, apparatus engineering, machine construction, heating installation, air conditioning, sanitary.

Following examples are intended to illustrate the invention but without limiting it.

EXAMPLES

Determination of the Physical Properties

The values of relative viscosity were determined according to DIN 53727.

The determination of mechanical properties is made on dry molded articles according to ISO 527 (Tensile modulus, tensile strength at break, elongation at break) or according to ISO 179/1eU (impact strength) or according to ISO 179/1eA (notched impact strength, Izod.) or according to ISO 75 ( heat deflection temperature HDT/A and HDT/C), respectively.

Figure 1:
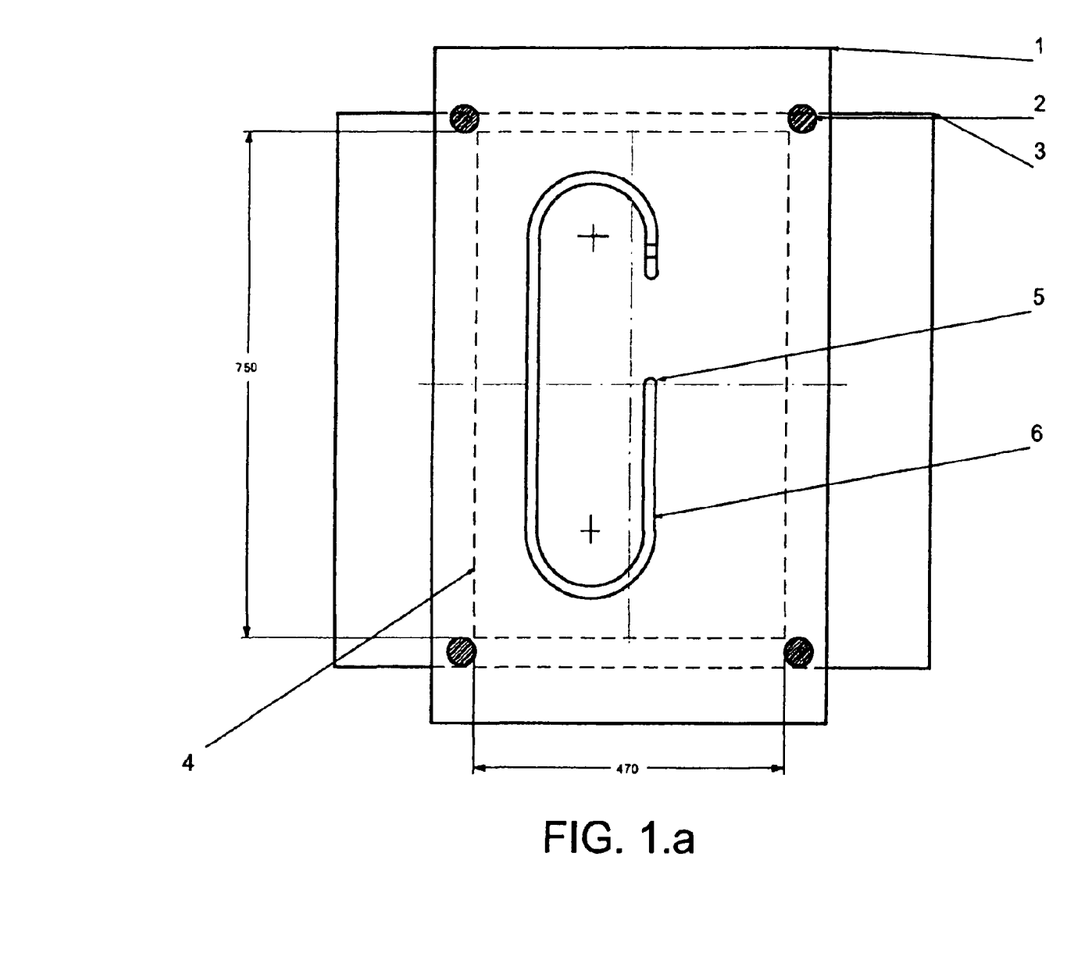
FIG. 1a is a top view of flow spiral.
FIG. 1b is a cross section flow spiral.

The evaluation of surface quality of molded articles having long flow lengths or long times for the molding during processing, respectively is made exemplary on flow spirals having a spiral length of 1300 mm and a spiral cross section plane of 400 $mm^2$ (see FIGS. 1.a and 1.b) according to intra-company standard of EMS-Chemie AG.

Explanations to the Examples

The molding materials were produced on a twin-screw extruder (Werner and Pfleiderer ZSK25 type). All components, with exception of the glass fibres, were mixed previously and introduced into the feed zone. The glass fibres were introduced into the melt by a sidefeeder (3 housing units before the nozzle).

The compounding was made at a screw rotation rate of 150 rpm and an output of 10 kg/h. Upon cooling the extruded strands into a water bath and they were granulated, then dried at 120° C. before a further processing.

Molded articles for the determination of mechanical and thermal material properties were produced on a injection molding machine (Arburg Allrounder 320-210-750 Hydronica type) at a screw rotation rate of 250 rpm.

The molding materials were processed for production of the flow spirals by an injection molding machine (Kraus Maffei KM 280-1650 B2 type) at constantly maintained machine settings, especially constant barrel zone temperatures and tool temperature, but having different injection speed profiles corresponding to respectively different injection times to determine the effect of the molding time to the surface quality.

For a 60 mm 3 zone standard screw injection times of 1 s, 3 s or 5 s, respectively resulted from injection speeds of 200 mm/s, 80 mm/s or 45 mm/s, respectively with respectively decreasing speed profile at flow length end. The respective injection pressure required for the mold filling of the flow spiral (maximum injection pressure) was recorded.

The flow spirals were evaluated with regard to the surface quality and rated on an evaluation scale of 1 to 6 (1: very good, no optically visible markings or other defects over the whole spiral length, 6: very poor optically visible markings and/or "tiger skin structure" over large regions and/or wrinkle formation).

Execution Examples 1 to 4 (AB1 to AB4) (see Table 1)

The molding materials of compositions in Table 1 were compounded at barrel zone temperatures of 330° C. The production of specimen was made at barrel zone temperatures of 325–340° C. and a mold temperature of 130° C. The production of flow spirals is made at barrel zone temperatures of 330–340° C. and a tool temperature of 140° C.

Surface qualities up to evaluation scale 2 (good, markings are hardly visible) are achieved as a function of additive amount of PA 6I/6T. The dimensional stability HDT/A and HDT/C is reduced just to an acceptable extent at nearly unchanged mechanical properties. Substantially increased amounts of PA 6I/6T (higher than 15 wt.-%) than those shown by the execution examples impair the heat dimensional stability strongly.

Comparison Example 1 (VB1) (see Table 1)

The moldings materials of compositions in Table 1 were compounded at barrel zone temperatures of 330° C. The production of specimen was made at barrel zone temperatures of 325–340° C. and a MOLD temperature of 130° C. The production of flow spirals is made at barrel zone temperatures of 330–340° C. and a tool temperature of 140° C.

In contrast to the Examples, no PA 6I/6T was used. The surface qualities of the flow spirals were evaluated as being poor (evaluation scale 4–5 for injection time of 1 s or evaluation scale 5 for injection time of 3 s, respectively) and substantially poorer than the surface quality of execution Examples 1–4 due to optically visible whitish markings, "tiger skin structure" over large regions and slight wrinkle formation.

Comparison Example 2 and 3 (VB2 to VB3) (see Table 1)

The molding materials of compositions in Table 1 based on PA 6T/66 were compounded at barrel zone temperatures of 320° C. The production of specimen was made at barrel zone temperatures of 315–330° C. and a mold temperature of 120° C. The production of flow spirals was made at barrel zone temperatures of 320–330° C. and a tool temperature of 130° C.

Without the addition of PA 6I/6T only a very poor surface quality (evaluation scale 6) is achieved which might be related to the high solidification velocity of PA6T/66.

Also, an addition of 10% of PA 6I/6T improves the surface quality only insignificantly. Altogether, it is not to be evaluated better as being evaluation scale 5 (poor, optically visible markings and "tiger skin structure" over large regions and wrinkle formation) even at the shortest injection time of 1 s. The fast solidification behaviour is not considered a major factor, presumably due to insufficient compatibility of PA 6T/66 with PA 6I/6T. For the surface quality no approximately similar effects are achieved than by the Examples 1–4.

While the invention has been disclosed in the patent application by reference to the details of preferred embodiments of the invention, it is to be understood that the disclosure is intended in an illustrative rather than a limiting sense as it contemplated that modifications will readily occur to those skilled in the art within the spirit of the invention and the scope of the appended claims.

Index of reference numerals for FIG. 1.a (top view flow spiral)

1: backing plate

2: guide pins

3: clamp plate

4: MOLD plate

5: gate with hot-runner

6: flow spiral

Index of reference numerals for FIG. 1b (cross section flow spiral)

1: nozzle side, polished

2: mating surface

3: outer side, structured

TABLE 1

| Composition moulding materials | | AB1 | AB2 | AB3 | AB4 | VB1 | VB2 | VB3 |
|---|---|---|---|---|---|---|---|---|
| PA6T/6I | wt. % | 41.7 | 39.7 | 37.7 | 35.7 | 49.7 | | |
| PA6T/66 | wt. % | | | | | | 49.7 | 39.7 |
| PA6I/6T | wt. % | 8 | 10 | 12 | 14 | | | 10 |
| carbon black | wt. % | 0.3 | 0.3 | 0.3 | 0.3 | 0.3 | 0.3 | 0.3 |
| glass fibres | wt. % | 50 | 50 | 50 | 50 | 50 | 50 | 50 |
| maximum injection pressure at injection time of 1 s | bar | 1115 | 1150 | 1140 | 1110 | 1175 | 1795 | 1890 |
| surface quality at injection time of 1 s | evaluation scale (1: very good, 6: very poor) | 3–4 | 2–3 | 2 | 2 | 4–5 | 6 | 5 |
| maximum injection pressure at injection time of 3 s | bar | 665 | 710 | 750 | 770 | 830 | 1415 | 1385 |
| surface quality at injection time of 3 s | evaluation scale (1: very good, 6: very poor) | 3–4 | 3–4 | 3 | 2 | 5 | 6 | 5 |
| maximum injection pressure at injection time of 5 s | bar | 575 | 580 | | 590 | 600 | 1185 | 1140 |
| surface quality at injection time of 5 s | evaluation scale (1: very good, 6: very poor | 4 | 3–4 | | 3 | 5 | 6 | 6 |
| elastic modulus | MPa | 18000 | 18100 | 18200 | 17900 | 18200 | 17200 | 17500 |
| tensile strength at break | MPa | 265 | 265 | 265 | 265 | 260 | 245 | 250 |
| elongation at break | % | 2.2 | 2.2 | 2.1 | 2.1 | 2.1 | 2.3 | 2.2 |
| impact strength at 23° C. | kJ/m$^2$ | 95 | 90 | 95 | 90 | 87 | 85 | 80 |
| impact strength at −23° C. | kJ/m$^2$ | 80 | 84 | 85 | 83 | 80 | 55 | 60 |
| notched impact strength at 23° C. | kJ/m$^2$ | 12 | 11 | 11 | 12 | 11 | 11 | 11 |
| notched impact strength at −30° C. | kJ/m$^2$ | 12 | 11 | 11 | 11 | 11 | 11 | 12 |
| HDT/A (1.8 MPa) | ° C. | 280 | 272 | 270 | 263 | 290 | 287 | 276 |
| HDT/C (8 MPa) | ° C. | 185 | 170 | 165 | 145 | 218 | 240 | 212 |

EXPLANATORY NOTES

PA 6T/6I: commercial article Arlen ® A3000 (producer: Mitsui Chemicals (J)), 70 mol % of terephthalic acid and 30 mol % of isophthalic acid as aromatic dicarboxylic acids or also commercial article Grivory ® HT XE 3733 NK (producer: EMS-Chemie AG (CH)), 70 mol % of terephthalic acid and 30 mol % of isophthalic acid as aromatic dicarboxylic acids
PA 6I/6T: commercial article Grivory ® G21 (producer: EMS-Chemie AG (CH)), 67 mol % of isophthalic acid and 33 mol % of terephthalic acid as aromatic dicarboxylic acids
PA 6T/66: commercial article Arlen ® C2000 (producer: Mitsui Chemicals (J)), 55 mol % of terephthalic acid as aromatic dicarboxylic acid and 45 mol % of adipic acid or also commercial article Grivory ® HT XE 3774 NK (producer: EMS-Chemie AG (CH), 55 mol % of terephthalic acid as aromatic dicarboxylic acid and 45 mol % of adipic acid.
Carbon black: Blackpearls ® 880, Cabot.
Glass fibres: Chopped glass, Vetrotex (955 type)

What is claimed is:

1. Reinforced thermoplastic polyamide molding materials having simultaneously good surface quality, good flowability and good heat dimensional stability comprising a polyamide composition comprising:

85–92 wt. % of a semi-crystalline semi-aromatic (co)polyamide having a melting point of at least 240° C., formed by
  ($A_1$) 50–80 mol % of units of terephthalic acid based on the whole amount of total acids,
  ($A_2$) 20–50 mol % of units of isophthalic acid based on the whole amount of total acids, the sum total of units of dicarboxylic acids being 100 mol %, and
  ($A_3$) 100 mol % of units of at least one linear or branched aliphatic diamine having 4–25 carbon atoms, the percentage molar amount of phthalic acids in said semi-crystalline semi-aromatic (co)polyamide being 100 mol % and the percentage molar amount of diamines being 100 mol %, and 8–15 wt. % of amorphous (co)polyamides having a melting enthalpy of not more than 1 cal/g, formed by
  ($B_1$) 55–100 mol % of units of isophthalic acid based on the whole amount of total acids,
  ($B_2$) 0–45 mol % of units of terephthalic acid based on the whole amount of total acids,
  ($B_3$) 100 mol % of units of at least one linear or branched aliphatic diamine having 4–25 carbon atoms based on the whole amount of present diamines
  the percentage molar amount of phthalic acids in said semi-crystalline semi-aromatic (co)polyamide being 100 mol % and the percentage molar amount of diamines being 100 mol %, and said molding material further comprises:

25–70 wt. % of a fibrous or particle filler or mixtures thereof
0–20 wt. % of a elastomer, and
up to 30 wt. % of usual additives and processing aid agents based on the total amount of said molding materials.

2. Reinforced thermoplastic polyamide molding materials having simultaneously good surface quality, good flowability and good heat dimensional stability from polyamide compositions on basis of semi-crystalline semi-aromatic (co)polyamide having a melting point of at least 240° C. (A) and amorphous (co)polyamides (B), characterized in that said polyamide compositions comprise:

(A) 85–92 wt. % of a semi-crystalline semi-aromatic (co)polyamide, formed by
  ($A_1$) 50–80 mol % of units of terephthalic acid based on the whole amount of total acids,
  ($A_2$) 20–50 mol % of units of isophthalic acid based on the whole amount of total acids, the sum total of units of dicarboxylic acids being 100 mol %,
  ($A_3$) 100 mol % of units of at least one linear or branched aliphatic diamine having 4–25 carbon atoms,
  the percentage molar amount of phthalic acids in said semi-crystalline semi-aromatic (co)polyamide being 100 mol % and the percentage molar amount of diamines being 100 mol %, and
(B) 8–15 wt. % of said amorphous (co)polyamides having a melting enthalpy of not more than 1 cal/g, formed by
  ($B_1$) 55–100 mol % of units of isophthalic acid based on the whole amount of total acids,
  ($B_2$) 0–45 mol % of units of terephthalic acid based on the whole amount of total acids, (B₃) 100 mol % of units of at least one linear or branched aliphatic diamine having 4–25 carbon atoms based on the whole amount of present diamines the percentage molar amount of phthalic acids in said semi-crystalline semi-aromatic (co)polyamide being 100 mol % and the percentage molar amount of diamines being 100 mol %, and said polyamide molding material further comprises:

(C) 25–70 wt. % of a fibrous or particle filler or mixtures thereof (D) 0–20 wt. % of a elastomer, (E) up to 30 wt. % of usual additives and processing aid agents based on the total amount of said components (A) to (B), if required further comprising prepolymeric polyamides having the relative viscosity of 1.01–1.30 (as measured in 0.5% m-cresol solution) in amounts of 0.1–20 wt. %, said prepolymeric polyamides being the same or different than said polyamide molding materials.

3. Polyamide molding materials according to claim 2 characterized in that said semi-crystalline semi-aromatic (co)polyamide has a melting point of about 280–350° C.

4. Polyamide molding materials according to claim 2 comprising 30–60 wt. % of said fibrous or particle filler or mixtures thereof.

5. Polyamide molding materials according to claim 2 characterized in that said semi-crystalline semi-aromatic (co)polyamide comprises 60–80 mol % of terephthalic acid, 20–40 mol % of isophthalic acid, 100 mol % of hexamethylenediamine, the percentage molar amount of phthalic acids being 100 % and the percentage molar amount of diamine being 100 %.

6. Polyamide molding materials according to claim 2 characterized in that said amorphous (co)polyamide consists of 60–80 mol % of isophthalic acid, 20–40 mol % of terephthalic acid, 100 mol % of hexamethylenediamine, the percentage molar amount of phthalic acids being 100 % and the percentage molar amount of diamine being 100 %.

7. Polyamide molding materials according to claim 2 characterized in that said additives and processing aid agents are selected from the group consisting of chain capping agents, stabilizers, crystallization agents, plasticizers, dyes, pigments, antioxidants, flame retardants, antistatics, lubricants, mold release agents, conductive additives, and metal powders.

8. Polyamide molding materials according to claim 2 characterized in that they comprise up to 6 wt. % of carbon black as said additives and processing agents.

9. Method for production of polyamide molding materials according to claim 2 wherein said polyamide molding materials are mixed in the melt or dry state and if required, prepolymeric polyamides having defined viscosities and in amounts of 0.1 to 20 wt. % of the polyamide matrix are mixed to said polyamide molding materials in said melt or dry state and at processing temperatures of 250–380° C. they are processed and discharged.

10. A method according to claim 9 characterized in that said polyamide molding materials are subjected to a post-condensation step.

11. A method of using said polyamide molding materials according to claim 2 for production of molded parts or finished articles.

12. A method of using said polyamide molding materials according to claim 1 for production of supporting structures in motor vehicles.

13. A method of using said polyamide molding materials according to claim 1 for production of tubes, hollow bodies and other semi-finished products.

14. The polyamide molding materials according to claim 1 wherein said aliphatic diamine having 4–25 carbon atoms is including hexamethylenediamine.

15. The polyamide molding materials according to claim 1 wherein said filler is glass fibers.

16. A method of using said polyamide molding materials according to claim 2 for production of supporting structures in motor vehicles.

17. A method of using said polyamide molding materials according to claim 2 for production of tubes, hollow bodies and other semi-finished products.

18. The polyamide molding materials according to claim 2 wherein said aliphatic diamine having 4–25 carbon atoms is including hexamethylenediamine.

19. The polyamide molding materials according to claim 2 wherein said filler is glass fibers.

* * * * *